Sept. 22, 1936.  A. KOTTMANN  2,054,905
ZERO-SETTING MECHANISM
Filed Sept. 8, 1931  9 Sheets-Sheet 1

Inventor:
August Kottmann
By Emil Bönnelycke
Attorney

Sept. 22, 1936.   A. KOTTMANN   2,054,905
ZERO-SETTING MECHANISM
Filed Sept. 8, 1931   9 Sheets-Sheet 3

Inventor:
August Kottmann
By Emil Bönnelycke
Attorney

Sept. 22, 1936.  A. KOTTMANN  2,054,905
ZERO-SETTING MECHANISM
Filed Sept. 8, 1931    9 Sheets-Sheet 4

Inventor:
August Kottmann
By Emil Bömelycke
Attorney

Sept. 22, 1936.  A. KOTTMANN  2,054,905

ZERO-SETTING MECHANISM

Filed Sept. 8, 1931  9 Sheets—Sheet 5

Inventor:
August Kottmann
By Emil Bönnelyke
Attorney

Sept. 22, 1936.  A. KOTTMANN  2,054,905
ZERO-SETTING MECHANISM
Filed Sept. 8, 1931   9 Sheets-Sheet 6

Inventor:
August Kottmann
By Emil Bönnelycke
Attorney

Sept. 22, 1936.    A. KOTTMANN    2,054,905
ZERO-SETTING MECHANISM
Filed Sept. 8, 1931    9 Sheets-Sheet 7

Inventor:
August Kottmann
By Emil Bönnelycke
Attorney

Sept. 22, 1936.  A. KOTTMANN  2,054,905

ZERO-SETTING MECHANISM

Filed Sept. 8, 1931   9 Sheets-Sheet 9

Inventor:
August Kottmann
By Emil Bonnelycke
Attorney

Patented Sept. 22, 1936

2,054,905

UNITED STATES PATENT OFFICE 2,054,905

ZERO-SETTING MECHANISM

August Kottmann, Sommerda, Germany, assignor to Rheinische Metallwaaren- und Maschinenfabrik Sommerda Aktiengesellschaft, Sommerda, Germany, a corporation of Germany Application September 8, 1931, Serial No. 561,807
In Germany September 16, 1930

2 Claims. (Cl. 235—73)

The invention relates to improvements concerning particularly calculating machines having automatic multiplying devices in accordance with the United States Patent No. 1,973,437, wherein both factors of the multiplication problem are first preset into the same settable elements and thereupon are selectively transferred by a transfer gearing controlled by two selectors, either to the multiplicand setting elements or to the multiplier setting elements.

The invention consists in that, by means of one of the selectors of the transfer gearing, the zero-setting device for the register mechanisms of the calculating machine is simultaneously set into operation.

Thus upon the transfer of one of the factors of the multiplication problem, the zero-setting device is simultaneously set into operation, and thereby an inadvertent omission of the zero-setting of the register mechanisms is prevented and erroneous results due thereto are avoided.

It has already been proposed to cause the zero-setting device of the registering mechanisms to be actuated, by means of the motor key. The device in accordance with the invention has the advantage over this known arrangement that it is applicable also to such calculating machines wherein the main drive of the calculating machine is caused to become engaged by the transfer gearing by a preparing action by one of the selectors, wherein therefore no special motor switch key is present, but wherein the connecting into service of the main drive means is done by one of the two selectors.

An exemplary embodiment of the invention is disclosed in the accompanying drawings, wherein.

The setting rods 1 are set by the keys 2 whose key levers move the intermediate levers 4 which by means of their hammer-like heads 4a force the setting pins 1 out of their position of rest and which rotate about the shaft 3.

Figure 2:
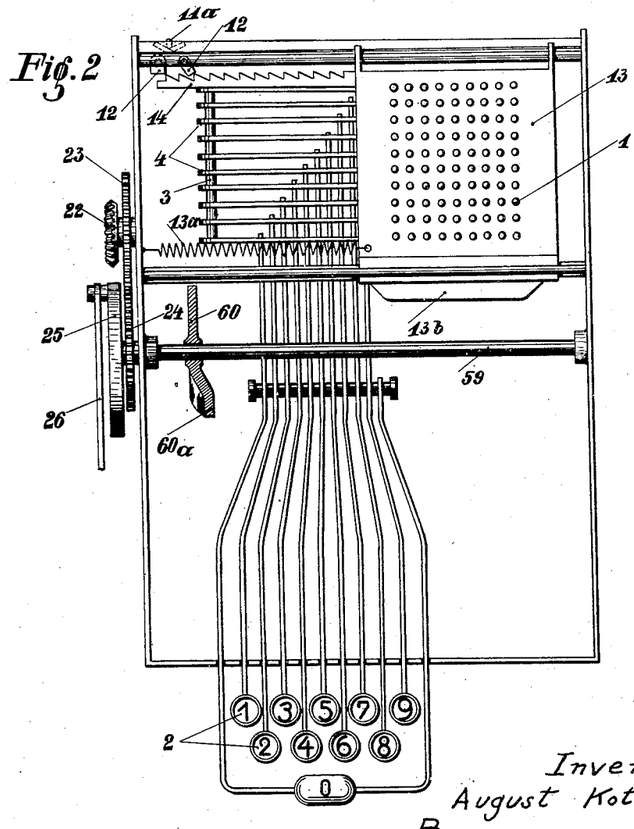
Fig. 2 is a top view showing the setting element carriage and the keyboard.
Figures 4, 6, 7:
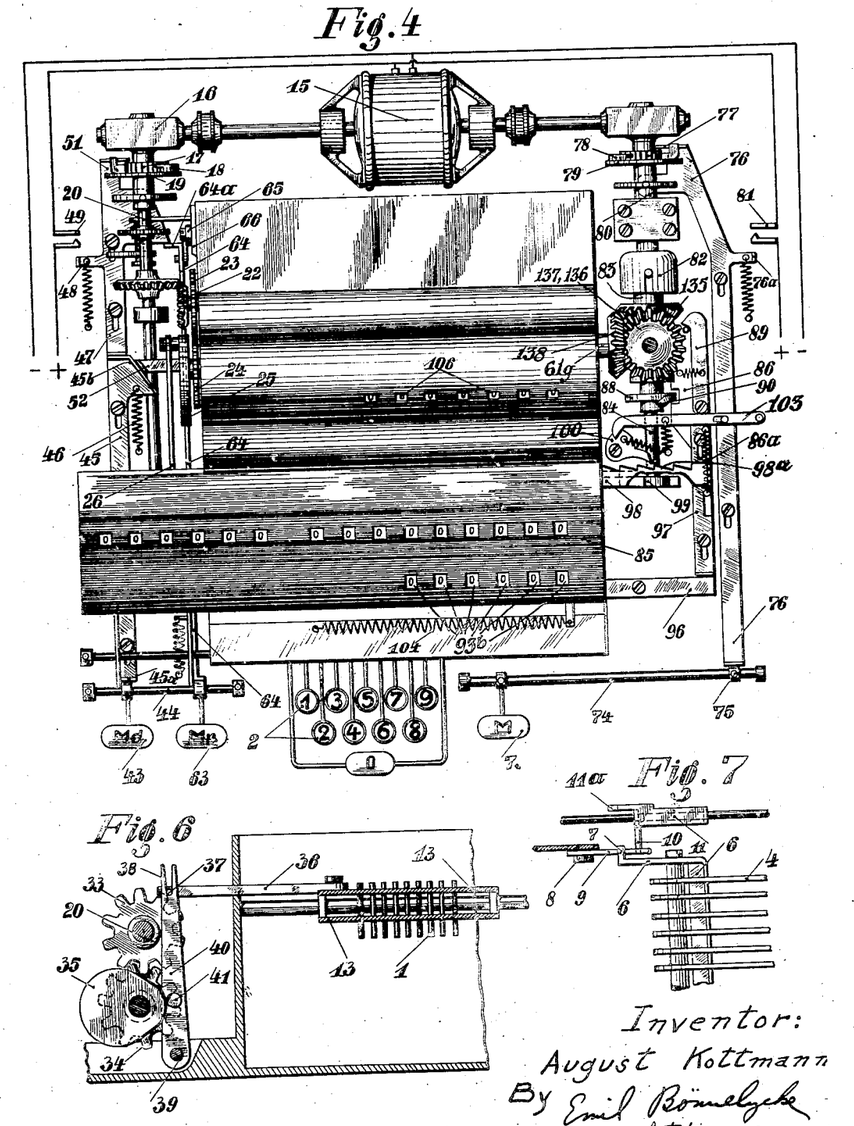
Fig. 4 is a plan view of a calculating machine with the drive and control elements exposed to view.
Fig. 6 is a sectional detail elevation of the zero-setting device of the setting element carriage.
Fig. 7 is an elevation of a switching device for moving the setting element carriage.

If one of these intermediate levers 4 is lifted by means of the keys 2, then the short arm 4b thereof will press against the bail 6, likewise moving about the shaft 3. The said bail 6, by means of its angle shaped end 7 and the pawl 9 engaged thereby and which is oscillatable about the screw 8, will turn the angle bail 11 (Fig. 7). This in turn actuates the anchors 12 which engage in the rack bar 14 (Fig. 2) and thus causes the setting element carriage 13, driven by a spring 13a, to move into the next decimal position.

Figure 3:
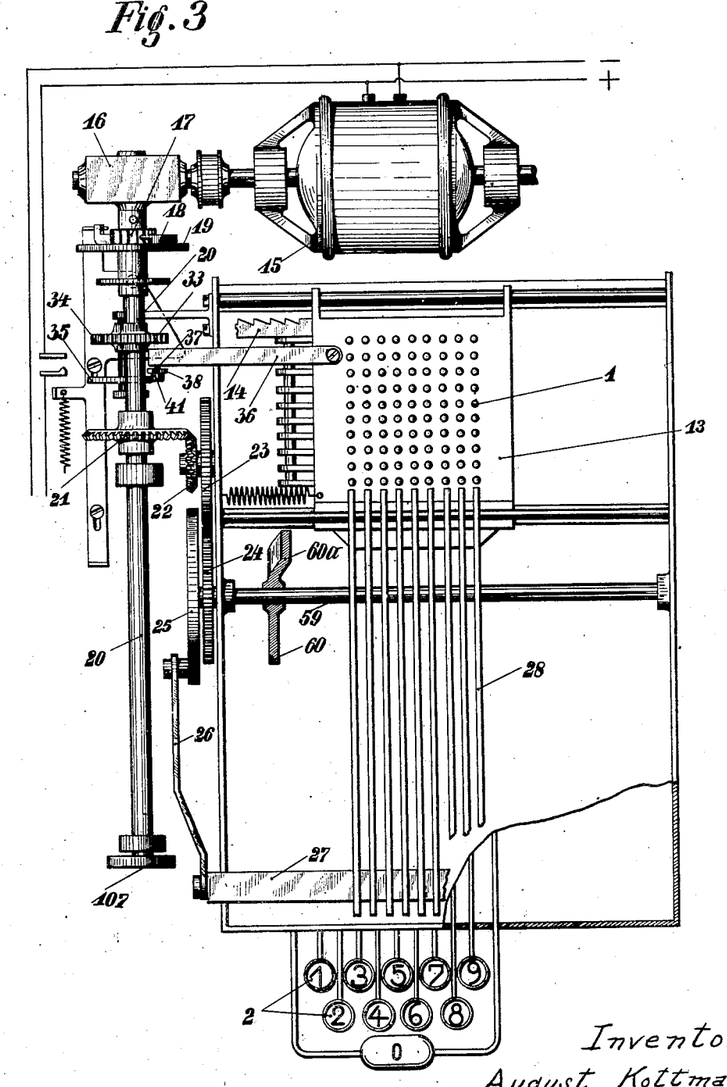
Fig. 3 is a plan view of the operating means for the rack bars which transfer the numeral values.

Corresponding to the number of rows of setting pins, there are rack bars 28 (Figs. 3, 5) supported above the setting element carriage 13, which have downwardly extending portions 28a which abut against a slide element 27. The slide element 27 is set into horizontal reciprocating pendulous movement by the motor 15, supported behind the calculating machine, through the gearing 16, drive element 17, clutch pawl 18, clutch disc 19, shaft 20, bevel gears 21 and 22, gear wheels 23 and 24, crank disc 25, and connecting rod 26.

Figure 5:
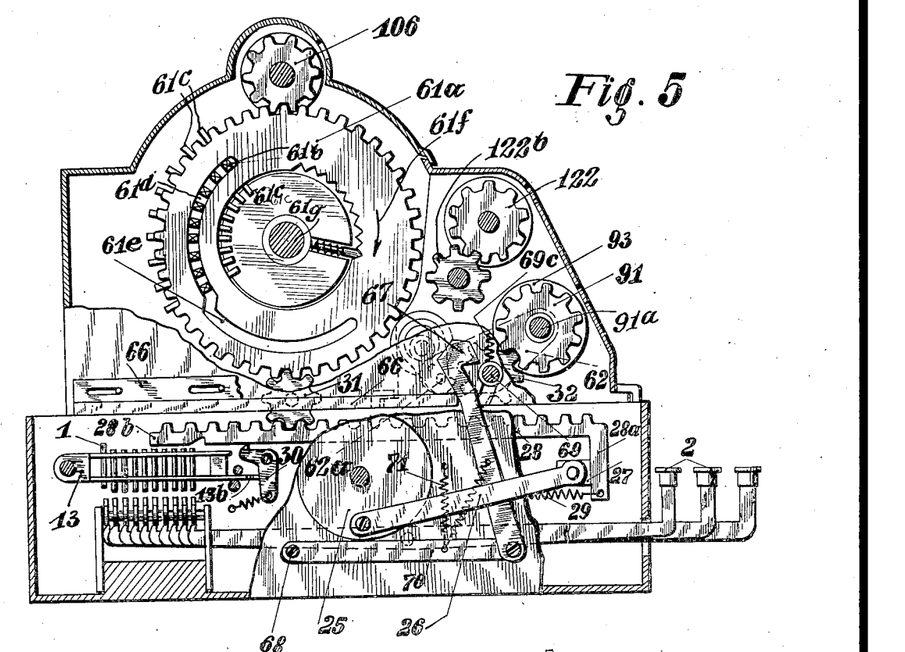
Fig. 5 is a partly sectional side elevation of the calculating machine.

In the position of rest of the drive shaft 20 the slide element 27 in Fig. 5 lies at the extreme right and moves to the left only upon the first half revolution of the crank disc 25, to return into the initial position upon the second half revolution.

The rack bars 28 are drawn to the left by the springs 29 and are thereby in position to follow the movements of the slide elements 27, in case they are not secured in the initial position by the latch 30 provided for each rack bar.

The latches 30 are disengaged by a projection 13b (Figs. 2 and 5) on the setting pin carriage 13, in the forward shifting of the latter, in such way that always only those rack bars under which rows of setting rods or pins lie can follow the slide element 27, Figs. 5 and 6. When the carriage 13 shifts laterally, only those latches 30 which lie above it will be actuated thereby.

If any setting pin 1 in the setting element carriage 13 is struck by means of the keyboard 2, the same will project into the field of movement of the rack bar 28 lying above the same. If the slide element 27 is now set into motion by means of the crank disc 25 and connecting rod 26, the rack bar 28 will follow the same until it abuts with its end 28b against the setting pin 1, whereby the magnitude of movement of the rack bar 28 constitutes a measure for the numerical value at that time corresponding to the setting pin 1.

Over each of the rack bars 28 which provide for transferring the values preset in the setting pins selectively either into the calculating drive wheels 61 or into the multiplying mechanism 91, 93, etc., there are two gear wheels 31 and 32, (Fig. 5), of which one set is in engagement with the setting discs 61 of the stepped wheels (register drive gears) and the others with the elements 91 of the multiplying mechanism which are to be set, and whereof as selected the one set or the other may be brought into engagement with the rack bars 28 upon the return of the slide element 27 and the latter, so that upon the return of the rack bars their movement corresponding to the preset numerical value would be transferred either to the register drive means or to the multiplying mechanism. Hereinafter it will be further explained how these gear wheels 31 and 32 are brought into or out of engagement with the rack bars 28.

Figure 1:
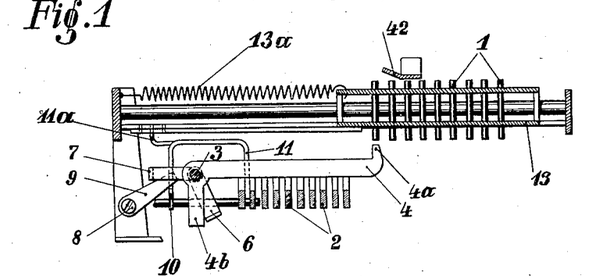
Fig. 1 is a side elevation of the setting element carriage with the setting elements, partly in section.

A bar 36 (Figs. 3 and 6) is secured to the setting element carriage 13 and engages, by means of a rod 37, into the fork 38 of a shift lever 40, arranged rotatably about the shaft 39. Upon the lever 40 there is a lug 41, which, as soon as the setting element carriage 13 moves to the left during the setting operation, enters into the vicinity of the cam 35, moved by the shaft 20, through the gear wheels 33 and 34, so that the setting element carriage 13 is again pressed back into the initial position by this cam after completion of the digits transfer. The inclined surface 42 (Fig. 1) provided over the setting element carriage 13 below which the setting rod carriage 13 passes on the return, provides for "clearing" or restoring the pins 1.

Figure 9:
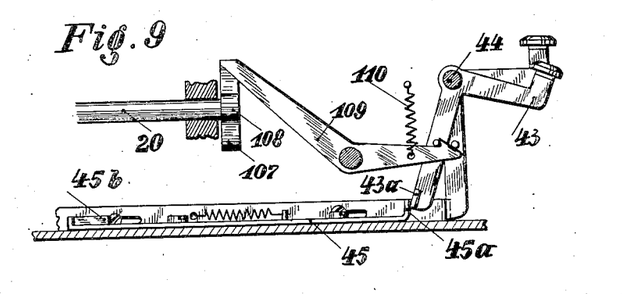
Fig. 9 is a partly sectional elevation of the selecting key which causes the engaging of the clutching elements of the register drive means.
Figures 11, 15:
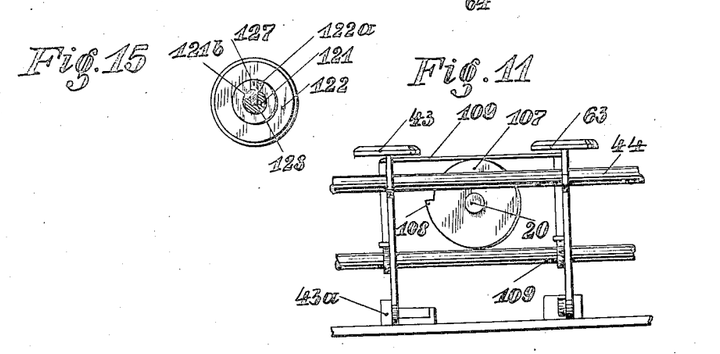
Fig. 11 is an elevation of a latching and unlatching drive for both selecting keys.
Fig. 15 is a side elevation of a number wheel.
Figures 12, 14, 14A:
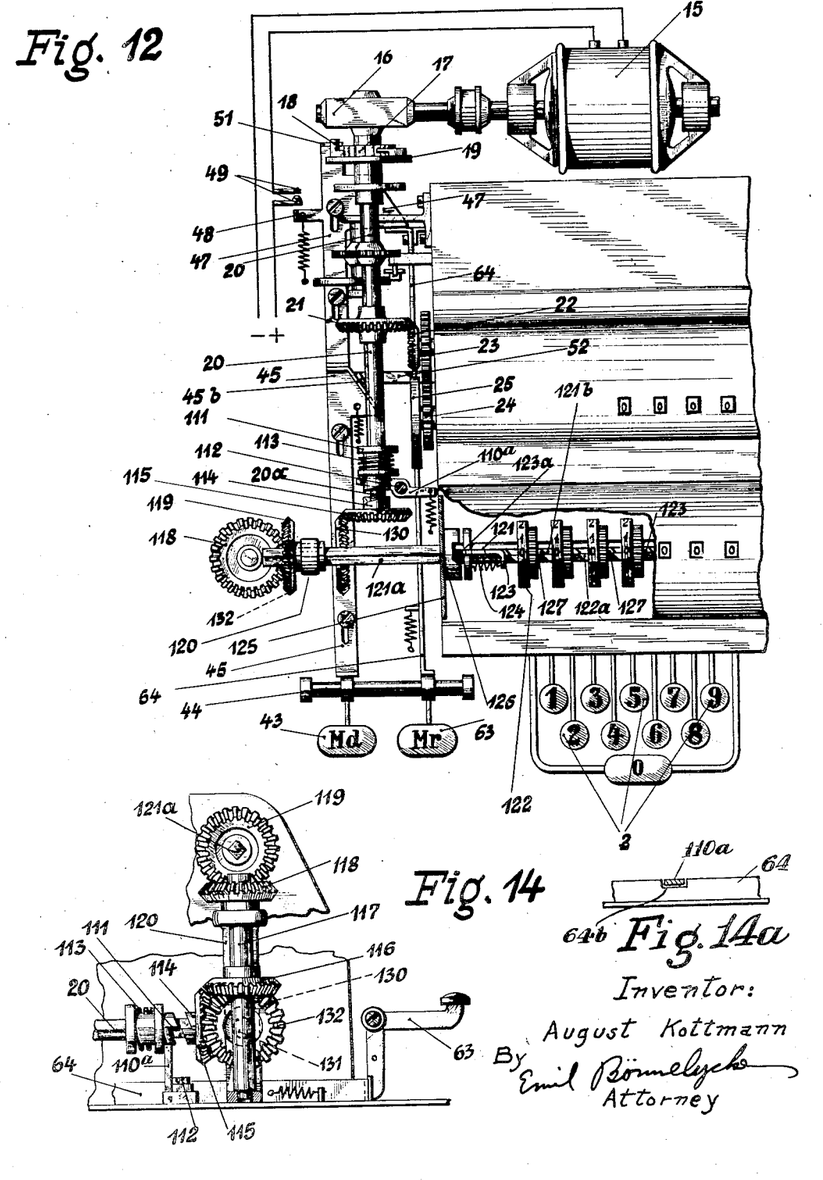
Fig. 12 is a top view of a part of the calculating machine embodying the device of the invention.
Fig. 14 is a side elevation of the device, partly broken away.
Fig 14a is a partial side view of a number of details of Fig. 14.
Figure 13:
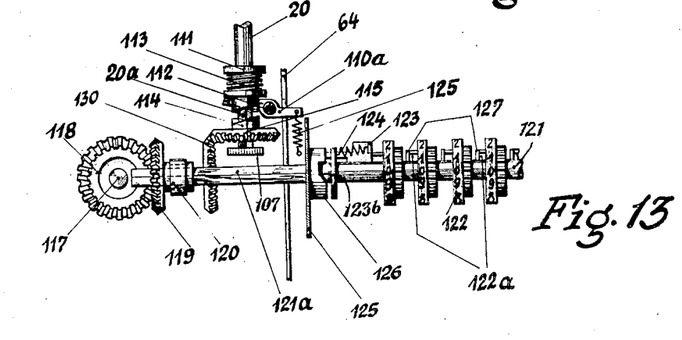
Fig. 13 is a detail showing the clearing arrangement in the position it assumes during the clearing operation.
Figure 13A:
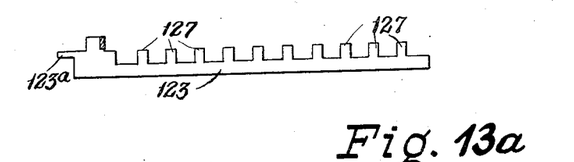
Fig. 13a is a side view of a detail of Fig. 13.
Figure 16:
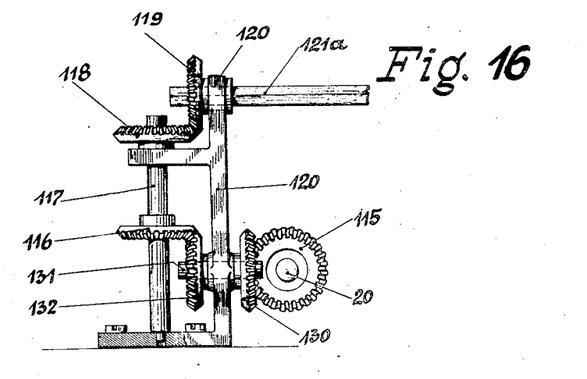
Fig. 16 is a side view showing an angle member and the gears supported thereby.

When the setting of the value in the setting pin carriage 13 has been accomplished and the transference of the same to the register drive mechanism as a multiplicand is desired, then the "Multiplicand" key 43 (Figs. 4, 9 and 11) arranged in front of the machine, designated "Md", should be actuated. The key 43 is pivoted about the shaft 44 and is so constructed that upon depressing it, its end 43a presses against the surface 45a of the slide bar 45 and shifts the same against the force of the spring 46 (Fig. 4). The slide bar 45 on the one hand carries along the bar 47, which by means of the projection 48 closes the switch 49 for supplying current to the motor 15 and by means of its end 51 releases the clutch pawl 18 and thereby provides connection between the driver 17 and the clutch disc 19 so that now the motor 15 will set the shaft 20 into rotation.

The slide bar 45 simultaneously forces the slide element 52 to the right by means of the incline 45b and thereby rocks the angle lever 53 (Fig. 8), which is pivoted in the machine frame by the pin 53a.

Figure 8:
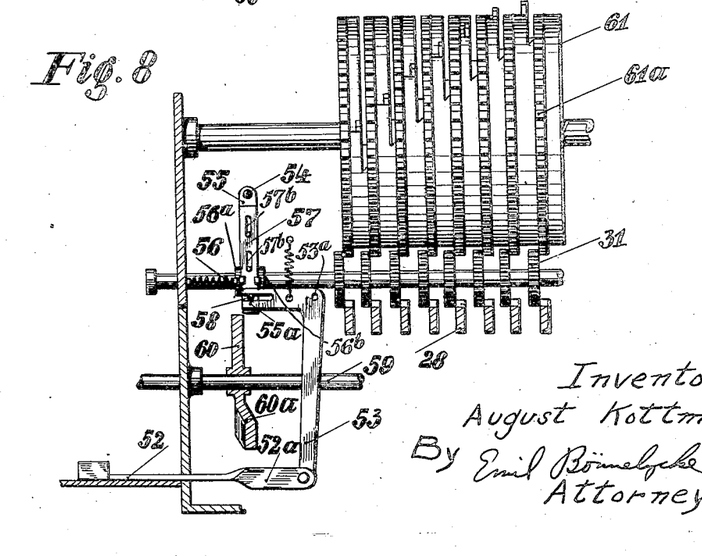
Fig. 8 is a partly sectional elevation of the clutch device between the rack bars and the setting discs of the stepped wheels.

The fork-like end 55a of the angle lever 53 encompasses the rod 58 of the latch 57, which by a slot and pin connection 57b is shiftable on the lever 55 pivotally arranged about the point 54. The lever 55 grips between two ring formed projections 56a, 56b, of the shaft 56 which is shiftably but non-rotatably arranged in the machine frame. Hence, by rocking the lever 55 about the pin 54, the shaft 56 is shifted for a desired distance into the direction of its length. If by rocking the angle lever 53 the latch 57 of the lever 55 in Fig. 8 is moved downward, it projects into the field of action of the cam 60, rotating with the shaft 59. Shaft 59 is operated by the gear wheel 24 already mentioned. If the latch 57 of lever 55 is moved downwardly by rocking angle lever 53 and the shaft 59 and thereby the cam 60 are set into rotation, then during the second half of the revolution, that is, during the return of the rack bars 28, the latch 57, the lever 55, and the shaft 56 are forced to the right by the bulge 60a, so that the gear wheels 31 (Fig. 5) freely rotatable but unshiftably set upon the shaft 56 will come into engagement with the setting discs 61 of the stepped wheels and with the rack bars 28, and thus provide a possibility of transferring from one part to the other. The numerical value preset in the setting pin carriage is therefore transferred to the register drive mechanism.

An indicating mechanism 106 (Fig. 5) in engagement with the setting discs 61a permits supervision at all times of the value set in the pin wheels. The pin wheels are constructed according to the Odhner type. By the rotation of the setting discs 61a relative to the wheels 61 in the direction of the arrow 61f, the lateral projections 61b of the radial pins 61c will in turn move out of the slot 61d and into the slot 61e whereby the pins 61c will one after another be moved outwardly. If the disc 61a is rotated relative to the wheel 61 in such a way that five lateral projections 61b are moved from the slot 61d into the slot 61e, then five pins 61c will be moved outwardly, and thereby the value "5" will be set.

The setting discs 61a are restored to their initial position by zeroizing the numeral wheels 106 (Fig. 5). The zero-setting device of the wheels 106 may be of any suitable type, for instance as described in German Patent No. 408,894.

Upon an extension of shaft 20 there is provided a cam disc 107 (Figs. 3, 9, 10 and 11) with a tooth 108. The latter is so arranged that after one revolution of the shaft 20 is nearly completed it lifts the latch bail 109, which by means of spring 110 secures the depressed key 43 in such depressed position, and thereby releases the key. At the instant that the key 43 is released, all the devices affected thereby are returned to their initial positions by means of suitably arranged springs. The shaft 20 driving the rack bars 28 therefore makes only one revolution, toward the end of which also the clutching wheels 31 providing the connection between the transfer rack bars 28 and the setting discs 61 of the stepped wheels are again disengaged.

Figure 10:
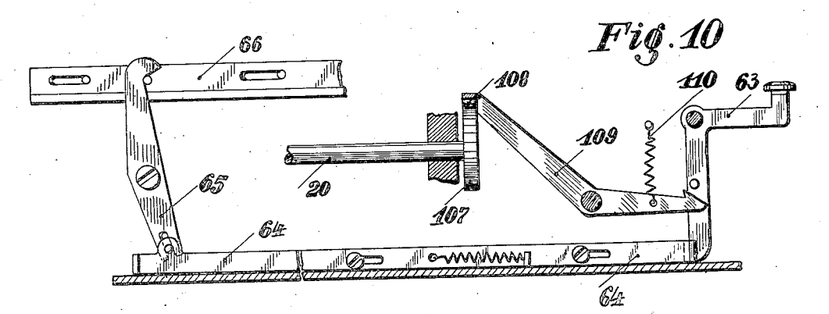
Fig. 10 is a partly sectional elevation of the selecting key which causes the engaging of the clutching elements of multiplying mechanism.

If the transfer of the value preset in the setting element carriage is to take place into the multiplication mechanism 62, that is, if the value is to be used as a multiplier, then the "Multiplier" key 63 (Figs. 4, 10 and 11) designated "Mr" is depressed. From this key the switch controlling the motor is closed through the connecting element 64, just as in the previously described key 43, and the clutch pawl 18 is released, that is, the drive is put in action. The member 64 (Fig. 4) has at its rear end a projection 64a extending to the left, which abuts against the projection 47a of the slide bar 47. Furthermore, the lever 65 is so oscillated and the slider 66 so carried along, by the key 63, that the slider 66, as Figs. 5 and 10 show, presses the hook 67 against the shaft 69 carrying the gear wheels 32.

The hook 67 (Fig. 5) is set into up-and-down swinging motion by means of the cam disc 25 and the lever 70, pivoted at the point 68, which is pressed against the said cam by the spring 71 in such manner that during the second half of the revolution of the cam disc 25, that is, during the return of the slide element 27 and the rack bars 28, it draws the shaft 69 downwardly and brings the gear wheels 32 into mesh with the rack bars 28. Inasmuch as the gear wheels 32 on the other hand are in engagement with the elements 91 of the multiplying mechanism which are to be set, the numerical value preset in the setting pins is transferred into the multiplying mechanism.

The gear wheels 32 do not come out of mesh with the gear wheels 91 inasmuch as the shaft 69 of the gear wheels 32, as well as the shaft 91a (see Fig. 5) of the gear wheels 91, and number wheels 93 are mounted in two links 62, which in turn are swingably mounted at 62a internally on the side walls of the housing of the registering mechanism. The spacing of the shafts 69 and 91a is therefore unchangeable. Both shafts are swung downwardly by the hook 67.

The hook 67 lies closely adjacent the left side wall of the machine frame in substantially the same plane as the crank disc 25, (see Fig. 4) thus rather far to the left. It projects from below into the housing 85 of the registering mechanism which is open below. The number wheels 93 and the gear wheels 91 and 32 lie rather far to the right in the housing of the register, as may be seen from the location of the peep holes 93b (Fig. 4). The portion of the shaft 69 which comes into engagement with the hook 67 is therefore free from gear wheels 32 and can freely slide through under the hook 67 when the register mechanisms shift.

Similarly to the key 43 provided for the multiplicand, here also the locking pawl for the key 63 will be released after completion of the transfer, by the same device, and the elements depending thereon here also will return to their previous positions, while the supply of current to the motor is interrupted. Thus also in this transfer the shaft 20 completes only one revolution and the rack bars 28 make only a single to-and-fro motion.

After the setting of the values in the setting element carriage and their transfer into the calculating machine has been completed in the above described manner, the key 73 (Fig. 4) designated "M" is used, whereby, by means of the shaft 74 and the rod 75, the position of the slide 76 is so changed that it releases the clutching pawl 78 and thereby connects the driver 77 and the clutch disc 79 together and simultaneously closes the switch 81, so that the current is supplied to the motor 15. Thus the shaft 80 is driven.

Figures 19, 20, 21, 22:
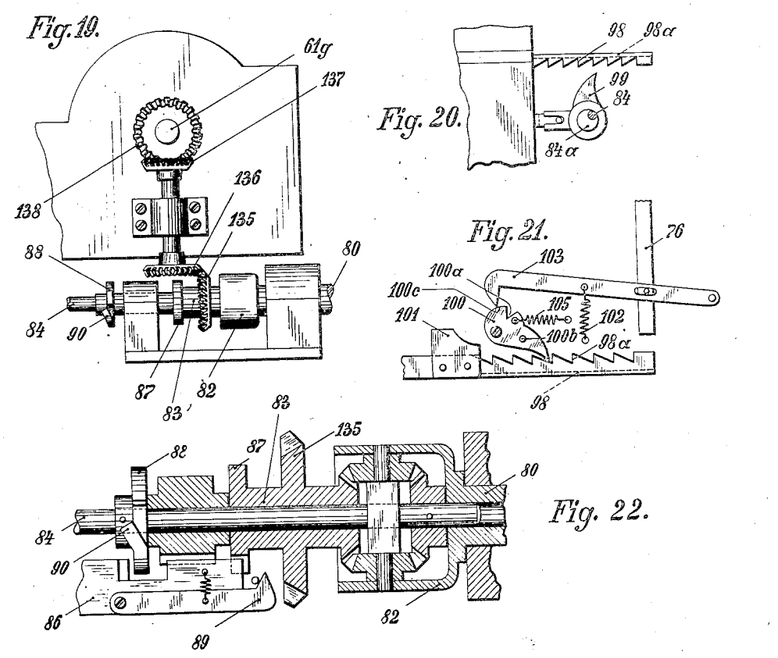
Fig. 19 is a detail elevation of the moving device for the register operating gearing of the calculating machine.
Fig. 20 is a detail elevation of the drive means for moving the register mechanism.
Fig. 21 is an elevation of a locking pawl for the rack bar of the register mechanism moving means.
Fig. 22 is a detail view, partly in central longitudinal section, showing the differential mechanism.
Figure 22A:
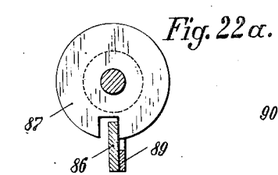
Figs. 22a and 22b are sectional views of a number of details of Fig. 22.
Figure 22B:
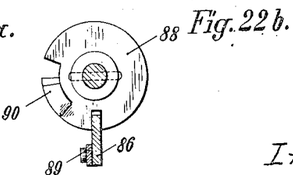

By means of a known differential drive means 82, the rotations of the shaft 80 are selectively transferred to one of the other two shafts 83 and 84 (Figs. 4, 22). Shaft 83 moves by means of the bevel gears 135, 136, 137, 138 and shaft 61g (Fig. 19) the calculating drive means 61, whereas shaft 84 actuates by the eccentric disc 84a the pawl 99 of the register shifting mechanism (Figs. 4, 20). The differential 82 (Figs. 4, 19, 22) is controlled by a locking element 86 carried in the subframe. This locking element 86 cooperates with two opposed locking elements 87 and 88 (Figs. 4, 22, 22a, 22b) of the differential shafts in such manner that when it comes out of engagement with one of the opposed locking elements it immediately is in engagement with the other, so that one of the two differential shafts is always free while the other is locked. Upon the locking element 88 there is provided a tooth 90, which, upon the assumption that the corresponding member is freed for a movement by the locking slide bar 86, toward the end of each revolution again so shifts the said locking slide bar that the shaft 84 is again locked. The shaft 84 is therefore always free only to the extent of one revolution.

Figure 17:
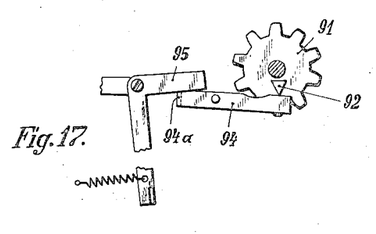
Fig. 17 is a detail side elevation of the drive device for the moving of the register mechanism.
Figure 18:
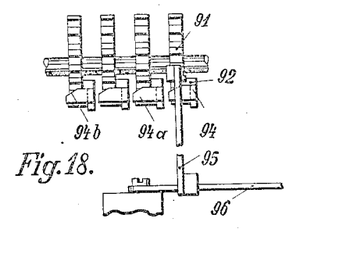
Fig. 18 is a rear elevation of the drive means illustrated in Fig. 17.

The slide bar 86 is driven by the gear wheels 91 of the multiplying mechanism 62 (Figs. 5, 17, 18). Small shifting lugs 92 (Figs. 17, 18) are secured to the gear wheels 91, which depress the lever 94 when the numeral disc 93 secured to the gear wheel 91 passes from "One" to "Zero". The lever 94 swings the angle lever 95 to such extent that the latter, through an intermediate member 96 (Figs. 4, 18), moves longitudinally a slide bar 97 arranged upon the previously mentioned locking slide bar 86, and thereby carries along the locking slide bar 86 in its movement, by means of the spring 86a. The yieldable connection of the slide bars 86 and 97 (through spring 86a) provides, in case any place of the multiplier is equal to "Zero", so that the register mechanism moving device must be twice successively engaged, and the shaft 84 must make two successive revolutions, whereby the slide bar 97 (Fig. 4) stands in the upwardly shifted position during two revolutions, that yet the slide bar 86 in Fig. 4 may transiently be shifted so far downwardly that the tooth 90 can pass through the notch of the slide bar 86 provided for the same. The register shifting mechanism of the calculating machine, as seen from Fig. 20, consists of a rack bar 98 secured to the register carriage 85 in the ratchet teeth of which engages a moving pawl 99 operated from the shaft 84 through the eccentric 84a so that in case the shaft 84 runs free, upon every revolution of the same the carriage will be carried on for one decimal place.

After each movement of the register mechanism through one place a locking pawl 100 (Figs. 4, 21) falls into a second row 98a of teeth arranged laterally of the rack bar 98 from tooth to tooth and secures the carriage 85 in its position at the moment.

If the carriage moves beyond the position intended for the last place, then a cam 101 cooperating with pin 100b (Fig. 21) forces the locking pawl 100 out of the ratchet teeth while simultaneously a further pawl 103 under the tension of the spring 102 falls into the notch 100a of the pawl 100 and secures it in the uninclined position, so that after completion of the calculation the carriage is automatically drawn back into the initial position by means of the spring 104 (Fig. 4) and stands ready for a further calculating operation. Upon pressing the key 73 for a new calculation operation the pawl 103 is removed from its locking position by the bar 76, so that the locking pawl 100 again falls into the ratchet teeth 98a through the tension of spring 105.

Figure 23:
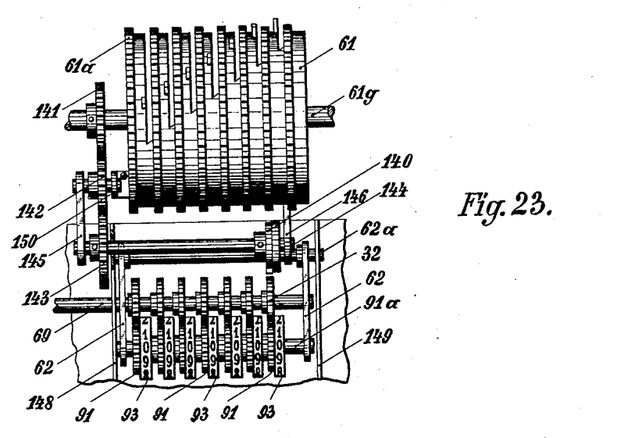
Fig. 23 is aside view of further details associated with the setting discs.
Figure 24:
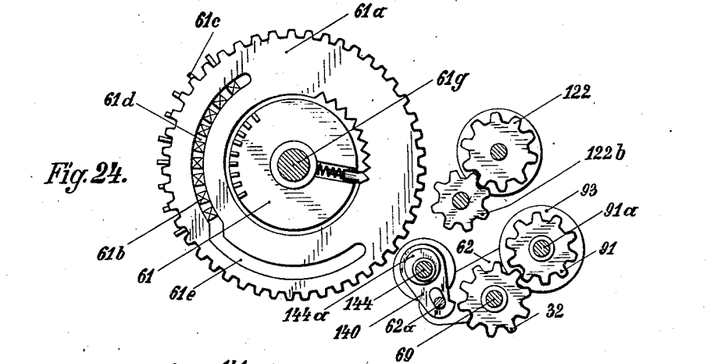
Fig. 24 is an end view partly in section of the setting discs and associated parts.
Figure 25:
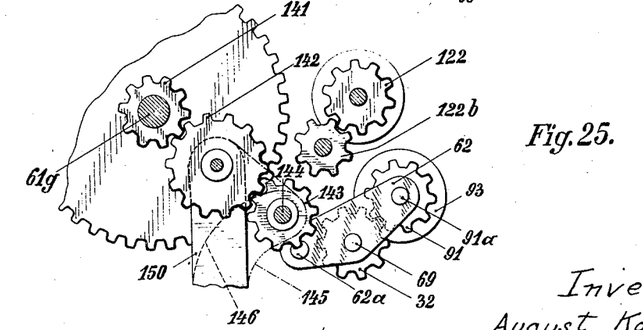
Fig. 25 is an end view of Fig. 23.

The machine operates as follows in calculating a product:

The gear wheels 32 which are in engagement with the adjusted elements 91 of the multiplying device come into engagement, in order, due to the shifting of the register mechanism, with a transporting pawl 140 (Figs. 18, 20) arranged unshiftably in the frame of the machine, which is made similarly to the transporting pawl 99 of the register shifting mechanism device. This transporting pawl 140 is moved, by means of gear wheels 141, 142, 143, shaft 144, and the eccentric disc 144a, by the drive shaft 61g of the register drive mechanism 61 (Figs. 23, 24, 25) and is guided by an elongated slot on the shaft 62a. The pawl 140 together with its drive are non-slidably mounted in the frame of the machine.

The shaft of the intermediate wheel 142 and the shaft 144 are mounted in the frame of the machine by means of holders 145, 146, and 150, whereas the shaft 62a is mounted in the intermediate walls 148 and 149 of the register housing.

The shaft 144 rotates at the same speed as the shaft 61g so that upon every revolution of the shaft 61g the pawl 140 turns the wheels 32 and 91 to an extent corresponding to the numerical value "one" back toward the zero position. Thus, if previously the gear wheel 91 and the number roll 93 were set to correspond to the numerical value 5, then upon the fifth rotation the number disc will pass from "One" to "Zero" and the register shifting mechanism is released. At each revolution of the register drives 61 the pins 61c, set in correspondence with the multiplicand, engage the intermediate wheels 122b and thereby rotate the number wheels 122 in correspondence with the multiplicand. After the multiplicand set in the register drive mechanism has been added five times in the "result" mechanism, therefore the counting mechanism carriage moves further to the extent of one place so that now the next wheel 32 comes into engagement with the transporting pawl. In this position of the register mechanism again as many additions are carried out as correspond to the setting of the figure roll 93, now moved by the transport pawl, whereupon the register mechanism transport is again released etc., until all the number rolls 93 are set to "Zero". For those gear wheels which are set to correspond to the digit "Zero", only a movement of the carriage takes place. When the calculation has been carried out and the carriage has reached the end position, then as already stated, the release of the latching pawl 100 takes place together with the return of the carriage into the initial position. If a "Zero" is contained at any place whatever of the multiplier which has been introduced, so that the lever 94 which corresponds to the multiplier setting member which has been set to correspond to zero in this place, is raised ab initio, then at the instant that this said multiplier setting element which indicates a zero goes into action, the inclined part 94b, of the lever 94, enters under the horizontal arm of the angle lever 95. Thereby the shifting means for the register is immediately put into engagement.

The levers 94 are bent around at the end, to form tongues or lugs 94a projecting to the left, as shown in Fig. 17. The tongues have the inclined parts 94b (Fig. 18), above mentioned, upon the left side.

As long as the edge 100c of the pawl 100 stands below the point of the pawl 103 the slide 76 is held in its position in which it closes the switch 81 to supply current to the motor 15 and releases the clutching pawl 78 so that the shaft 80 is driven. As soon as the point of the pawl 103 enters the slot 100a of the pawl 100 the slide 76 and the multiplication key return to their initial position whereby the motor and the clutch are thrown out.

By the depressing of the key lever 63 and the shifting of the connecting element 64 produced thereby, a pawl 110a in the shape of a two-armed lever, which lies with one arm in a notch of the connecting element 64 and presses with the second arm against a clutch element 111, is swung to such extent about its pivotal point 112, that it releases the clutch member 111, and the latter is brought, by the pressure of a spring 113, into engagement with a cooperating clutch element 114. Thereby transmission of motion has now become possible from the shaft 20, driven by the motor 15, to the bevel gear 115. This movement is imparted to the bevel gear 119, through bevel gear 130, shaft 131 and bevel gear 132. The shafts 131 and 117 and the bevel gear 119 are arranged in an angle member or bracket 120 arranged stationarily in the frame of the machine.

The bevel gear 119 drives the shaft 121 of the product registering mechanism, upon which the number wheels 122 are loosely arranged. The part 121a of the shaft 121 projecting from the shiftable product mechanism is made squared. It can shift axially in both directions in the bevel gear 119 and can move along with the shiftable product mechanism, in which the shaft 121 is unshiftably supported, whereas the bevel gear 119 on the other hand can partake of only the rotary movement, because it is arranged together with gear wheel 118 on the common angle member 120, which is stationary in the frame of the machine.

In the round portion of the shaft 121 is cut a longitudinal groove which receives an axially shiftable slide 123.

In its position of rest, the slide 123 lies with its beveled end 123a held by the tension of the spring 124 in the notch 123b of a controlling element 126 stationarily arranged on the side wall 125 of the housing of the product mechanism.

If the shaft 121 be rotated, the slide 123 will be forced to partake of this movement and to slide with its bevel part 123a over an opposing beveled portion, out of the notch 123b of the controlling element 126, and to move to the right, in the groove 121b, against the force of the spring 124. Thereby the projections 127, which are located upon the slide 123, of which a number is provided which corresponds to that of the number wheels 122 of the product mechanism, project out of the groove 121b into the field of action of other projections 122a, which are provided upon the number wheels 122. If one of the number wheels 122 during the preceding calculating operation has been turned out of its zero position, then the slide 123 will engage behind the projection 122a of the number wheel by means of its projection 127 corresponding to the number wheel in question, and will carry the latter along to such extent in its rotary motion that said numeral wheel will again be located in its zero position and the result of the calculation therefore is again cleared, while at the same instant—that is, after one revolution—the slide will again bring its beveled end to the notch 123b of the controlling element 126 and will spring back into its initial position, due to the tension of spring 124, so that the projections 127 are removed from the region of the projections 122a.

As has already been described, the shaft 20 clears the zero-setting mechanism after one revolution by the cam disc 107 by depressing the key 63 and all of the movable parts will return to their original positions by spring action. Thereby the two armed lever or pawl 110a and the coupling part 111 and also the connecting element 64 will return to their normal positions so that zero-setting mechanism can be disconnected. The shaft 121, upon depression of the key 63, therefore makes only one revolution the same as the shaft 20. All the devices affected thereby then are returned to their initial positions by means of suitably arranged springs, and with them also the pawl 110 and the clutch element 111. The driving means of the zero-setting device is therefore again disengaged after one revolution of the zero-setting shaft 121.

I claim as my invention:

1. In a calculating machine a product register, a multiplier mechanism, means for setting a multiplier therein, a carriage with setting pins, a drive shaft, a control member operative to control operation of the drive shaft, transfer gearing operated by said shaft for transferring a value set up in the pin carriage to said multiplier setting means, shaft driven means for zeroizing the register, mechanism operative to couple the zeroizing shaft to the drive shaft, and means positively connected to the control member operative, upon operation of the latter, to render said coupling mechanism operative during a single turn of the two shafts, operation of said control member thereby simultaneously effecting a multiplier set-up in the multiplier mechanism and a zeroizing of the product register.

2. A calculating machine in accordance with claim 1 wherein mechanism for coupling the zeroizing shaft to the drive shaft includes a releasable clutch which is controlled by said control member.

AUGUST KOTTMANN.